US011298997B2

(12) United States Patent
Stieglitz et al.

(10) Patent No.: US 11,298,997 B2
(45) Date of Patent: Apr. 12, 2022

(54) MULTI-POINT LINK FOR AN UNDERCARRIAGE OF A MOTOR VEHICLE

(71) Applicant: ZF FRIEDRICHSHAFEN AG, Friedrichshafen (DE)

(72) Inventors: Andre Stieglitz, Osnabrück (DE); Ingolf Müller, Minfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/266,235

(22) PCT Filed: Jul. 10, 2019

(86) PCT No.: PCT/EP2019/068471
§ 371 (c)(1),
(2) Date: Feb. 5, 2021

(87) PCT Pub. No.: WO2020/030370
PCT Pub. Date: Feb. 13, 2020

(65) Prior Publication Data
US 2021/0291603 A1 Sep. 23, 2021

(30) Foreign Application Priority Data
Aug. 8, 2018 (DE) ...................... 10 2018 213 321.2

(51) Int. Cl.
*B60G 7/00* (2006.01)
(52) U.S. Cl.
CPC ........ *B60G 7/001* (2013.01); *B60G 2206/013* (2013.01); *B60G 2206/11* (2013.01); *B60G 2206/7101* (2013.01); *B60G 2206/821* (2013.01)

(58) Field of Classification Search
CPC ............. B60G 7/001; B60G 2206/013; B60G 2206/11; B60G 2206/7101; B60G 2206/821
See application file for complete search history.

(56) References Cited

U.S. PATENT DOCUMENTS 4,753,456 A * 6/1988 Booher ................... B29C 70/52
280/124.134
4,841,801 A 6/1989 Tice
(Continued)

FOREIGN PATENT DOCUMENTS

DE 102011051115 12/2012
DE 202014101418 7/2015
(Continued)

OTHER PUBLICATIONS

Office Action dated Apr. 8, 2021 issued in German Patent Application No. 10 2018 213 321.2.

*Primary Examiner* — Darlene P Condra
(74) *Attorney, Agent, or Firm* — Cozen O'Connor

(57) ABSTRACT

A multi-point link for a chassis of a motor vehicle. The multi-point link has at least one profile portion with two bearing areas arranged at opposite ends of the profile portion, the two bearing areas are connected to one another by the profile portion. An outer circumferential surface of the profile portion is provided with at least one stiffening element to increase the stiffness of the multi-point link, and the stiffening element is connected to the outer circumferential surface of the profile portion by material bonding.

17 Claims, 7 Drawing Sheets

(56) References Cited

U.S. PATENT DOCUMENTS

| | | | | |
|---|---|---|---|---|
| 2013/0154310 | A1* | 6/2013 | Neumann | B60G 21/051 |
| | | | | 296/204 |
| 2014/0014256 | A1 | 1/2014 | Padden | |
| 2015/0259511 | A1* | 9/2015 | Nakano | C08K 7/14 |
| | | | | 524/494 |
| 2020/0139776 | A1* | 5/2020 | Rupflin | B29C 66/12441 |

FOREIGN PATENT DOCUMENTS

| | | | | |
|---|---|---|---|---|
| DE | 202014101418 U1 * | 7/2015 | | B29C 70/86 |
| DE | 102014218601 | 3/2016 | | |
| DE | 102016200609 | 7/2017 | | |
| DE | 102016211213 | 12/2017 | | |
| DE | 102017207164 A1 * | 10/2018 | | B29C 66/1248 |
| EP | 2722533 | 4/2014 | | |
| EP | 2569175 | 3/2015 | | |
| FR | 2890591 | 3/2007 | | |
| FR | 2993806 A1 * | 1/2014 | | B60G 7/001 |
| WO | WO-2016041714 A1 * | 3/2016 | | B60G 7/001 |

\* cited by examiner

MULTI-POINT LINK FOR AN UNDERCARRIAGE OF A MOTOR VEHICLE

CROSS REFERENCE TO RELATED APPLICATIONS

This is a U.S. national stage of Application No. PCT/EP2019/068471 filed Jul. 10, 2019. Priority is claimed on German Application No. DE 10 2018 213 321.2 filed Aug. 8, 2018 the content of which is incorporated herein by reference.

BACKGROUND OF THE INVENTION

1. Field of the Invention

The invention is directed to a multi-point link for a chassis of a motor vehicle.

2. Description of Related Art

Multi-point links for chassis of motor vehicles, particularly of utility vehicles, are known from the prior art. For example, axle suspensions for rigid axles of utility vehicle frames can have two two-point links in a lower link plane, which are formed as axle struts for guiding the rigid axle. Vehicle frames of utility vehicles can have a three-point link or, alternatively, a four-point link in an upper link plane. Axle struts generally have two end-side bearing areas, which are connected to one another by a straight profile portion. The straight profile portion can have an open, e.g., H-shaped, cross section. When a straight two-point link is loaded by a compressive force acting in longitudinal direction thereof, there is a risk of failure due to a buckling of the straight profile portion perpendicular to the longitudinal direction. The longer the straight profile portion, the greater the risk.

A straight two-point link with two end-side bearing areas which are formed integral with a profile portion that is straight and open at the same time is known from DE 10 2016 200 609 A1. The profile portion is formed convex along its extension in longitudinal direction. The convexity extending in longitudinal direction has a maximum in the center of the profile portion, where a risk of buckling of the profile portion is greatest. A lower mass of the two-point link can be achieved through a load-oriented design of this kind.

SUMMARY OF THE INVENTION

It is an object of one aspect of the invention to provide an alternative construction of a multi-point link with at least one profile portion in which the multi-point link also has a low component mass owing to a load-oriented design.

Accordingly, one aspect of the invention provides a multi-point link for a chassis of a motor vehicle. The multi-point link has at least one profile portion with two bearing areas arranged at opposite ends of the profile portion. The two bearing areas are connected to one another by the profile portion. According to one aspect of the invention, an outer circumferential surface of the profile portion is provided with at least one stiffening element to increase the stiffness of the multi-point link, and the stiffening element is connected to the outer circumferential surface of the profile portion by material bonding.

By the stiffening element, the profile portion can be stiffened in a load-oriented manner at those locations where higher stresses can occur during driving operation. Accordingly, it is not necessary that the cross section of the profile portion be designed over its entire longitudinal extension for maximum stress that only occurs at one or more locations of the profile portion. In this way, an overdimensioning of the profile portion can be avoided and the material usage for the multi-point link can be minimized at the same time. In the context of the present invention, "stiffness" means the resistance of the profile portion against plastic deformation or fracture brought about by a force or a torque, a bending moment or a torsional moment. As a result of the at least one stiffening element, the area moment of inertia or the section modulus of the profile portion is increased in the area in which the stiffening element is materially bonded to the outer circumferential surface of the profile portion. In this way, the profile portion can be stiffened depending on the types of stress and magnitudes of stress existing along the course of its longitudinal extension.

The profile portion can be straight or curved over its longitudinal extension. When the profile portion is formed as a straight profile portion, the profile portion particularly extends in a columnar manner with constant cross section over its entire longitudinal extension. When the profile portion is formed in a curved manner, it preferably has a constant radius of curvature. In particular, the profile portion is formed solid, i.e., free from voids. In particular, the profile portion is formed as an open profile portion. Within the meaning of the present invention, an "open profile portion" means a profile portion which, when considered in cross section, has ribs, flanges or the like facing outward from the profile. Accordingly, a profile portion with a double T-shaped, H-shaped or double E-shaped cross section, for example, is an open profile portion. Alternatively, the profile portion can also be formed as a closed profile portion without ribs, flanges or the like facing outward from the profile and can have a rectangular or square solid cross section, for example. The profile portion can also be formed as a hollow profile portion and, when considered in cross section, can have one or more internal hollow chambers. The profile portion and the at least one stiffening element can be made from the same material or from different materials.

The bearing areas are operatively, particularly rigidly, connected to the profile portion or formed integral therewith and can transfer operating loads such as forces and/or torques into the profile portion. In particular, the bearing areas respectively have a joint receptacle. In particular, at least one bearing area has an opening oriented perpendicular to a longitudinal direction of the profile portion. The opening may be formed in the manner of a pot with an opening, for example, for receiving a joint ball of a ball stud of a ball joint. Alternatively, the opening can also be formed as a through-opening, for example, with a cylindrical through-opening for receiving a molecular joint, also referred to as a clamp joint. In particular, the through-opening has an unmachined inner circumferential surface in the installed state. Alternatively, the bearing area can have a through-opening which has an unmachined inner circumferential surface in the unfinished state and has a finish-machined inner circumferential surface, produced particularly by cutting, in the installed state.

Within the context of one aspect of the present invention, a profile portion is in particular a portion of a continuous profile. When one side of the outer circumferential surface of the profile portion, particularly a side facing a roadway in the installed state, is covered by the stiffening element over its entire longitudinal extension, a stone impact protection is provided for the profile portion in addition to the stiffening of the profile portion. When the outer circumferential surface of the profile portion is completely covered by the stiffening element, the stiffening element also offers protection against small stones which are carried along in the tire tread in driving operation and are thrown against the profile portion from above. The stiffening element can be exactly as long as the profile portion or shorter than the profile portion.

Because of the material bond connection of the stiffening element to the outer circumferential surface of the profile portion, the outer circumferential surface of the profile portion may be covered by the stiffening element merely locally. In this case, a contact surface of the stiffening element that faces the outer circumferential surface of the profile portion and is separated from the latter only by an adhesive layer is smaller than the outer circumferential surface of the profile portion. The outer circumferential surface of the profile portion can also be completely covered by the stiffening element. In this case, the contact surface of the stiffening element is just as large as the outer circumferential surface of the profile portion. In this latter case, depending on the specific configuration of the stiffening element, the principal transmission of forces and or torques can be carried out solely through the stiffening element. Alternatively, the outer circumferential surface of the profile portion can also be covered locally or completely by a plurality of individual stiffening elements. The outer circumferential surface of a profile portion which has no internal hollow chamber is composed of the total outer surface of the profile portion that would be wetted if the profile portion were immersed in a water bath, minus the surface of two end sides of the profile portion.

The stiffening element can extend over the entire length, or over a part of the total length, of the profile portion in a longitudinal direction of the profile portion. The stiffening element is preferably columnar with constant cross section over its longitudinal extension. The stiffening element can be formed as an extruded profile, particularly an aluminum extruded profile. Alternatively, the stiffening element can also comprise a fiber-reinforced plastic with reinforcing fibers which can take the form of woven, laid or knitted fabrics and/or as continuous fibers in the form of a drawn-out filament bundle, also known as roving. According to a further alternative, the stiffening element can also be constructed to be contoured, for example, convex, in longitudinal direction thereof. The stiffening element can have function-integrating elements. For example, the stiffening element can be formed as a die cast component part with an integrated holding arm for a cable or a hose. Function-integrating elements can serve, for example, for connecting tubes or hoses for transporting liquid or as cable holder or as holder for sensor elements or actuator elements or as support for electronics components, for example, for damage detection, or as mounting surface.

The multi-point link can be a straight two-point link, i.e., a bar-shaped link which is elongated in one spatial direction and suitable for transmitting forces and/or moments. Acting upon a two-point link of this kind are primarily tensile and/or compressive forces which are introduced into the profile portion via the two bearing areas. The two-point link, which can be formed as an axle strut for guiding a rigid axle of a utility vehicle, has, in particular, a profile portion with a center line extending in a straight line. In particular, this center line is congruent with a straight line through center points of the two bearing areas. In an arrangement of this kind, a loading of the straight two-point link by a compressive force, the line of action, which is congruent with the center line, leads to a pure compressive stress and a pure buckling stress within the two-point link which are not superposed by a bending stress. When the two-point link is formed as an axle strut, it can be acted upon not only by tensile, compressive and buckling stresses brought about by accelerating and braking processes but also by bending stresses and torsional stresses caused by rolling movements of a vehicle body. Alternatively, the multi-point link can also be a non-straight two-point link with a curved profile portion, which profile portion preferably has a constant radius of curvature.

Alternatively, the multi-point link can also be formed as a three-point link. A three-point link of this kind can be arranged in an upper link plane of a frame of a utility vehicle, where it serves to guide a rigid axle. Further, it is also conceivable to use a three-point link of this kind as a control arm for guiding a wheel. The three-point link preferably has two identical profile portions which are straight and open at the same time and which converge in a common bearing area, which can be part of a central link of a rigid axle, for example. In an arrangement of this kind, the two profile portions are also, inter alia, under bending stress during driving operation. The multi-point link may also be a four-point link, for example, with two profile portions, which run parallel to one another, are straight and are simultaneously open and have, in each instance, two bearing areas arranged at opposite ends of the two profile portions, or may be formed as a five-point link.

The multi-point link can be a one-piece multi-point link or a built multi-point link, i.e., a multi-point link composed of a plurality of separately produced individual parts. This latter mode of construction has the advantage, for example, that the at least one profile portion can be produced with variable length so that different variants of the multi-point link can be realized in a modular manner. Owing to a load-oriented geometric configuration of the stiffening element, which is connected to the outer circumferential surface of the profile portion by material bonding, can be adapted in a modular construction principle of this kind to the profile portion which is produced to have variable length. In this case, it is particularly advantageous that the convexity described in the beginning is not formed integral with the profile portion as was known from the prior art but, rather, can be arranged on the outer circumferential surface of the profile portion as demanded. But this advantage also comes into play in multi-point links in which the profile portion is formed in one piece with the bearing areas. In this case, a basic shape of a multi-point link with a straight columnar profile portion can be prepared for various uses with different kinds of load and magnitudes of load by applying different convexities in the form of variously formed stiffening elements. With a built multi-point link, the bearing areas can be formed as separate load introduction elements, particularly with an opening for receiving a joint.

An adhesive layer is preferably arranged between the profile portion and the stiffening element and connects the profile portion and the stiffening element to one another by material bonding. The stiffening element is glued to the outer circumferential surface of the profile portion by the adhesive layer. The gluing is, in particular, a full-surface gluing. The adhesive of the adhesive layer can be, for example, a two-component adhesive. The adhesive may be applied only to the outer circumferential surface of the profile portion or only to a contact surface of the stiffening element or to both surfaces before fitting the stiffening element to the profile portion. Alternatively, the adhesive can also be applied to the above-mentioned surfaces in the form of adhesive beads and distributed by the subsequent placement of the stiffening element on the profile portion by squeezing.

According to a preferred construction, at least one contour area of the profile portion is surroundingly enclosed by the stiffening element such that the profile portion is connected to the stiffening element in this contour area via material bonding and positive engagement at the same time. In this way, in addition to a material bonding connection of the stiffening element to the outer circumferential surface of the profile portion, a positive engagement connection of the two above-mentioned mating members is additionally provided. In particular, the contour areas of the profile portion have partial surface areas of the outer circumferential surface of the profile portion which extend parallel to one another. In this context, a "positive engagement connection" means a connection in which forces are transmitted perpendicular to a contact plane by the shape of the component parts participating in the connection.

The profile portion advisably has a cross section with a crosspiece extending in a vertical direction and a plurality of flanges, which are spaced apart parallel to one another and connected to one another by the crosspiece, and the flanges extend in a transverse direction oriented orthogonal to the vertical direction. In particular, the cross section of the profile portion is formed symmetrically with respect to two symmetry planes oriented orthogonal to one another. In particular, every flange is connected to any other flange via the crosspiece. The cross section of the profile portion can be formed as an H-profile with four flanges extending away from the crosspiece in a rib-like manner. In particular, the cross section of the profile portion is formed in a double E-shape with a total of six flanges, three of which flanges extend away from the crosspiece in a rib-like manner in directions which are offset by 180°. The above-mentioned longitudinal direction of the profile portion extends perpendicular to the vertical direction and perpendicular to the transverse direction at the same time. In particular, the flanges extend in transverse direction when installed in a chassis of a motor vehicle, particularly of a utility vehicle. In this way, geometric areas in which unwanted substances can collect, for example, sprayed water mixed with road salt, are prevented from forming between individual flanges.

A free end of a flange is preferably surroundingly enclosed by the stiffening element. The surrounding enclosure refers to a cross section of the profile portion. The free end of the flange forms a contour area of the profile portion which is connected, particularly glued, to the stiffening element via material bonding and simultaneously via positive engagement. Without the stiffening element, there is the risk in case of higher compressive forces acting in longitudinal direction of the profile portion, particularly of the straight profile portion, that free ends of the flanges will bulge in some areas, which may lead to failure due to buckling of the profile portion with increasing compressive forces. This is prevented by the surrounding enclosure of the free end of the flange and, accordingly, the maximum possible compressive loading of the profile portion, in particular of the straight profile portion, is increased. The free end of the flange is oriented in particular in transverse direction. Alternatively, a flange can also be surroundingly enclosed in its entirety by the stiffening elements. In this case, the flange forms a contour area of the profile portion which is connected, particularly glued, to the stiffening element by material bonding and, at the same time, by positive engagement.

In an advantageous manner, a plurality of flanges, which are arranged parallel to one another, are surroundingly enclosed by the same stiffening element. In particular, the stiffening element has at least one coupling portion depending on the existing quantity of flanges, which are arranged parallel to one another. Two adjacent areas of the stiffening element, which enclose two adjacent flanges arranged parallel to one another, are rigidly connected to one another by the coupling portion so that the stiffening effect of the stiffening element is further increased. When three flanges are arranged parallel to one another, the stiffening element has, for example, two coupling portions through which the three areas of the stiffening element which enclose the flanges are rigidly connected to one another. In particular, the coupling portions are formed in one piece with the stiffening element. In particular, the coupling portions extend in vertical direction.

According to a further development of the invention, the stiffening element has wall portions of different thickness. In particular, the wall portions of different thickness are configured in a load-oriented manner so as to contribute further to minimizing material usage.

According to an alternative, the stiffening element is formed as a hollow profile with at least one hollow chamber. By "hollow profile" is meant in this context a profile which, when considered in cross section, has at least one circumferentially closed void. By forming the stiffening element as a hollow profile, the area moment of inertia of the profile portion provided with the stiffening element can be increased in a mass-neutral manner. The stiffening effect of the stiffening element is increased in particular with increasing distance of the void from the cross sectional center point of the profile portion.

The outer circumferential surface of the profile portion is advantageously provided with a plurality of stiffening elements. In particular, the plurality of stiffening elements are arranged symmetrically with respect to one another in any cross sections of the profile portion. This symmetrical arrangement refers in particular to a symmetry plane, which is defined by the vertical direction and the longitudinal direction of the profile portion. The plurality of stiffening elements can be an even or odd quantity of stiffening elements. By the plurality of stiffening elements, it is possible in a simple manner to stiffen the profile portion in a load-oriented manner.

Preferably, the plurality of stiffening elements surround the profile portion completely, in particular completely adjacently, at least at one location. Apart from the stiffening effect, a complete surrounding of the profile portion has the added advantage that the profile portion is especially protected, for example, against mechanical damage through stone impact and/or corrosive damage through road salt, in the area surrounded by the plurality of stiffening elements. Alternatively, the profile portion can also be locally or completely surrounded by an individual annularly closed stiffening element. In this case, the one stiffening element can be spaced apart from the outer circumferential surface of the profile portion circumferentially only by the adhesive layer.

The plurality of stiffening elements are advisably identically formed at least in cross section. In this way, the plurality of stiffening elements can be cut from the same bar stock in a cost-effective manner. The bar stock can be an extruded profile or a pultruded profile. In particular, the plurality of stiffening elements are formed as identical carryover parts. Apart from a cost-effective production, use of carryover parts has the further advantage of eliminating confusion between component parts.

It is advantageous when the plurality of stiffening elements partially overlap. The stiffening effect of the plurality of stiffening elements can be further increased in this way, particularly when the overlapping areas are connected to one another, for example, by gluing. In particular, the overlapping areas of a plurality of stiffening elements directly contact one another or are separated from one another by an adhesive layer. In particular, the overlapping areas have a geometrically uniform extension in longitudinal direction of the profile portion so that the stiffening elements with the overlapping areas can be produced in a simple manner from bar stock.

The plurality of stiffening elements preferably communicate with one another circumferentially through catch connections, snap connections or clip connections. By the catch connections, snap connections, or clip connections, the stiffening elements can be glued to the outer circumferential surface of the profile portion in a simple manner and without additional aids such as clamping devices, for example. In particular, the plurality of stiffening elements communicate with one another circumferentially by the catch connections, snap connections, or clip connections in common overlapping areas in which the plurality of stiffening elements partially overlap. The catch connections, snap connections or clip connections have, in particular, a geometrically uniform extension in longitudinal direction of the profile portion so that the stiffening elements with the catch connections, snap connections, or clip connections can be produced in a simple manner from bar stock.

The profile portion is preferably formed as a pultruded profile portion from a continuous fiber reinforced plastic. A particularly lightweight multi-point link can be made in this way. In the present instance, a "pultruded profile portion" means a profile portion produced in a pultrusion process. The pultrusion process is a method for cost-effective production of fiber-reinforced plastic profiles in a continuous operation. In particular, the profile portion has reinforcing fibers which are distributed over the entire profile cross section and which extend in the longitudinal direction of the profile portion so that a high stiffness and strength is effected in this direction. For the dimensioning of the profile portion against kinking and/or bulging, relatively high proportions of drawn fibers are advantageously arranged in edge areas of the profile cross section so as also to run in longitudinal direction of the profile at the same time. In particular, all of the fibers are oriented in longitudinal direction of the profile portion. In a preferred embodiment form, the pultruded profile portion has a fiber volume content of approximately 65 percent so as to simultaneously achieve a high stiffness in the longitudinal direction of the profile and, at the same time, a high bending stiffness as well as good force transmission of fibers in the profile portion. In general, a fiber volume content of between 50 percent and 75 percent is possible.

Carbon fibers, glass fibers, aramid fibers or natural fibers embedded in a plastic matrix can be used in the profile portion. The matrix system advantageously comprises a vinyl ester resin because the latter can be processed favorably in the pultrusion method with very good chemical and mechanical properties. In addition, vinyl ester resin has good adhesion when combined with adhesives. Alternatively, an epoxy resin, polyester resin, phenol resin or polyurethane resin can be used as matrix material. The continuous fiber reinforced plastic is particularly a fiber-reinforced plastic (FRP) which is formed from a plastic matrix with reinforcing fibers embedded therein. The reinforcing fibers are formed as continuous fibers. The fiber-reinforced plastic can be formed, for example, as a glass-fiber reinforced plastic (GRP) or carbon-fiber reinforced plastic (CRP) or as an aramid-fiber reinforced plastic (ARP). Alternatively, the profile portion can also be formed as an extruded profile portion, for example, from aluminum or an aluminum alloy.

It is advantageous when at least one bearing area has a spline, and the spline and an end portion of the profile portion mutually engage in one another in a common connection portion and are glued to one another at the same time. Owing to this type of connection, a relatively large gluing surface can be realized, which meets the loadability of the connection between the spline and the end portion of the profile portion. In particular, the spline has teeth that extend at least substantially in a longitudinal direction of the profile portion, particularly of the straight profile portion. In the area of the spline, the bearing area is not formed solid but rather is reduced by the volume of intermediate spaces between the teeth. Aside from the teeth of the spline, only the associated end portion of the profile portion and adhesive are located in the connection portion. In particular, the connection portion is at least substantially free from entrapped air. In particular, the end portion of the profile portion and the spline engage in one another in the connection portion at least substantially via positive engagement.

In particular, the stiffness of the bearing area is reduced in longitudinal direction of the profile portion, particularly of the straight profile portion. During a tensile loading of the profile portion, particularly of the straight profile portion, tensile forces tend to pull the end portion of the profile portion out of the spline in longitudinal direction of the profile portion. The reason for the reduction in stiffness of the bearing area in the area of the spline is that, under tensile load, the teeth of the spline undergo an elastic elongation in longitudinal direction of the profile portion, particularly of the straight profile portion, to a greater extent than would be the case with a solid construction of the bearing area in the area of the spline. In particular, the spline is provided with through-slots which extend therethrough in a grid-like manner perpendicular to the longitudinal direction of the profile portion and which simultaneously at least partially intersect. In particular, the teeth of the spline have a length, which is substantially at least twice as large as a maximum width of the teeth, so that there results a relatively high elastic ductility of the spline in longitudinal direction of the profile portion during a tensile load as well as during a compressive load. A reduction in the stresses occurring in the adhesive layer can be achieved, particularly during a tensile loading of the profile portion with its two bearing areas, through the relatively thinly shaped teeth. This is also because a relatively large bonding surface can be achieved between the profile portion and the respective associated bearing area by a relatively large quantity of teeth.

In particular, the teeth are formed in one piece with the bearing area. In particular, the bearing area is formed as a separate load introduction element. In particular, the teeth of the spline have a rectangular or square full cross section along the longitudinal extension thereof in longitudinal direction of the end portion of the load introduction element. In particular, the through-slots at least partially run in a straight line in longitudinal direction of the profile portion. This means that some through-slots may have a straight-line shape while others may not. In particular, the teeth of the spline at least partially adjoin through-slots by two of four longitudinal sides extending in longitudinal direction of the profile portion. In particular, the teeth can adjoin through-slots by two, three or four longitudinal sides extending in longitudinal direction of the profile portion. When it is stated that through-slots which extend perpendicular to the longitudinal direction of the connection portion and which simultaneously at least partially intersect extend through the end portion of the load introduction element, this means that not every through-slot need intersect any of the remaining through-slots.

The through-slots extending perpendicular to the longitudinal direction of the profile portion advantageously have a constant width in a first direction and a varying width in a second direction extending perpendicular to the first direction. In particular, all of the through-slots that extend in the same direction perpendicular to the longitudinal direction of the connection portion are formed identically; that is, they have a constant width or a varying width. In particular, the through-slots with constant width have a surface which is machined, preferably cut, particularly milled. In particular, the through-slots with varying width have a surface which is unmachined, particularly extruded, so that no machining costs are incurred. In particular, the through-slots with varying width have an increased width in the area of the tooth bases and/or in the area of the free ends of the teeth facing the profile portion.

In particular, the free ends of the teeth facing the profile portion have a minimum cross-sectional area perpendicular to the longitudinal direction of the profile portion. By this is meant that teeth of the spline, referring to the shape of the teeth in longitudinal direction of the profile portion, have the smallest cross-sectional area at their free ends. As a result, the teeth have at their free ends an additionally reduced stiffness in longitudinal direction of the profile portion. In particular, the free ends of the teeth facing the profile portion have, perpendicular to the longitudinal direction of the profile portion at least in one extension direction, a greater distance from one another than is the case in at least one other area in longitudinal direction of the profile portion. This is particularly because the through-slots with varying width have a greater width in the area of the free ends of the teeth. In particular, the adhesive by which the spline is connected to the end portion of the profile portion has, at least partially, a greater layer thickness in the area of the free ends of the teeth. Owing to the increased adhesive layer thickness, local stresses in the adhesive layer can be reduced and distributed more uniformly on the entire connection portion.

In particular, to further reduce the stiffness of the spline, the teeth of the spline are advantageously at least partially narrowed in longitudinal direction of the profile portion at tooth bases at which the teeth transition into solid material of the bearing area. In particular, tooth bases are narrowed at their longitudinal sides which adjoin through-slots with variable width. Since the profile portion has a constant cross section over the longitudinal extension thereof, an at least partially thickened adhesive layer results in the area of the tooth bases. In particular, widened tooth spaces in the area of the tooth bases which result from the narrowed tooth bases are filled with adhesive. Owing to the increased adhesive layer thickness, local stresses in the adhesive layer are accordingly reduced and distributed more uniformly on the entire connection portion.

In particular, at least one tooth of the spline is formed so as to continuously narrow over its longitudinal extension toward the profile portion. By this is meant that the at least one tooth has, at its tooth base, a maximum cross-sectional area which decreases continuously toward its free end until reaching a minimum at its free end. Accordingly, the at least one tooth has, at the same time, perpendicular to the longitudinal direction of the profile portion, a stiffness which continuously decreases toward the free end thereof in longitudinal direction of the common connection portion. The continuous narrowing of the at least one tooth likewise contributes to a continuous transition of the stiffness ratios in longitudinal direction of the profile portion. In particular, the at least one tooth which continuously narrows toward the profile portion is a corner tooth with two longitudinal sides that extend in longitudinal direction of the profile portion and which adjoin through-slots.

In particular, the bearing area, particularly the load introduction element, is formed as a profile piece, particularly an extruded profile piece, with unmachined outer circumferential surfaces and/or inner circumferential surfaces that extend in a longitudinal direction of the profile. This has the advantage that relatively inexpensive bar stock can be used as starting material for the bearing area. A cold-drawn or rolled profile piece, for example, is also a possible alternative to the extruded profile piece. In this context, outer circumferential surfaces of the profile piece can all be surfaces that are wetted when the profile piece is completely immersed in a water bath, any voids that may possibly be present having been sealed beforehand. The rest of the surfaces are inner circumferential surfaces when there are voids present that extend in longitudinal direction of the profile piece. In the context of the present invention, a profile piece is a piece of a continuous profile. In particular, the profile piece has a constant cross-sectional geometry over its longitudinal extension.

The profile portion can be inserted in longitudinal direction thereof into the spline until the stop or can be at a distance from this maximum position. The spline is particularly advantageous during tensile and/or compressive loading, but also during torsional and/or bending loads. In particular, the length of the connection portion substantially corresponds to an outer dimension of the cross section of the profile portion. This results in a relatively large length of the connection portion. This is the outcome particularly during loading of the profile portion with its two bearing areas or load introduction elements at elevated temperatures when the adhesive softens somewhat under the influence of temperature and so becomes elastic. In this case, the glue connection is also acted upon in the area of a tooth base when the profile portion and the two bearing areas undergo tensile loading. The reason for this is that the adhesive is less strong and rigid at higher temperatures and tensile stresses are shifted in direction of the tooth bases.

Accordingly, the relatively large length of the connection portion represents a kind of reserve load-carrying ability at relatively high ambient temperatures. An appreciably greater length of the connection portion does not then significantly increase the load carrying capacity of the joint between the bearing area and profile portion. An appreciably smaller length of the connection portion leads to a reduction in the load carrying capacity. By stating that the spline and the end portion of the profile portion engage in one another "at least substantially" by positive engagement, it is meant that the two end areas do not directly adjoin one another—at least not over the entire surface—but rather have a slight clearance with respect to one another, and this slight clearance is filled with an adhesive distributed in particular over the entire surface. The glued plug-in connection has an epoxy adhesive in particular. Alternatively, other adhesives such as methyl methacrylate adhesives, for example, can also be employed.

As has already been stated, the spline is particularly advantageously connected to the profile portion because a relatively large gluing area can be realized by gluing the teeth of the spline to outer circumferential surfaces of the end portion of the profile portion and possibly also to inner circumferential surfaces of hollow chamber(s) of the profile portion. Further, the spline is also advantageous for producing the multi-point link because excess adhesive can be removed in a simple manner through the through-slots. When the end portion of the profile portion is inserted into the spline, air is displaced from the through-slots. This displaced air can also easily escape via the through-slots so that entrapped air in the common connection portion of the profile portion and load introduction element is prevented at least to a great extent.

In addition to the end portion of the profile portion, at least one stiffening element inside of the connection portion also preferably engages in the spline. In particular, a portion of the stiffening element or stiffening elements that is located inside of the spline is glued to the bearing area or load introduction element in the area of the connection portion. In this construction, the stiffening element or stiffening elements can extend over the entire length of the profile portion. Alternatively, the stiffening elements can engage in the connection portions and extend out of the latter at the same time by 5 to 35 millimeters, preferably 10 to 30 millimeters. In this way, favorable stress states can be achieved in the mating partners concerned at the location where the profile portion and the stiffening element exit from the connection portion, particularly when the spline and the stiffening element are formed from aluminum and the profile portion is formed from continuous fiber reinforced plastic.

When the entire outer circumferential surface of the profile portion is enclosed by stiffening elements, which are connected thereto by material bonding, the profile portion can be formed as a foam core particularly when the individual stiffening elements overlap circumferentially. In this case, the stiffening elements, already on their own, generate a sufficient buckling stiffness through a high area moment of inertia and section modulus. An arrangement in which a stiffening element or a plurality of stiffening elements in the connection portion engage in the spline in addition to the end portion of the profile portion can be particularly advantageous when the load introduction element is formed as a portion of an extruded profile and has extruded through-slots. Since extruded through-slots must have a minimum width for reasons inherent to the process, a profile portion of aluminum with wall thicknesses filling the extruded through-slots is generally overdimensioned and therefore heavier than necessary. However, if the profile portion comprises a continuous fiber reinforced plastic and the stiffening element comprises an aluminum profile, it is possible to produce a construction which is not overdimensioned and in which the end portion of the profile portion and the stiffening element lie one over the other so as to fill the extruded through-slots of the spline.

It is advantageous when the two bearing areas have a spline in each instance and the outer circumferential surface of the profile portion is completely covered by the at least one stiffening element between the two splines. In particular, two stiffening elements, each of which is continuous uninterruptedly, extend between the two splines and together at least substantially circumferentially surround the part of the profile portion located between the two splines. This results in an effective protection against stone impact particularly when the two stiffening elements are made of aluminum. Further, when the profile portion is made from continuous fiber reinforced plastic and the at least one stiffening element is formed from aluminum, possible damage to the multi-point link through external influences can easily be detected. Such damage may be brought about, for example, by positioning a vehicle jack at the profile portion of an axle strut and can be detected from deformation marks on the aluminum stiffening element.

BRIEF DESCRIPTION OF THE DRAWINGS

The invention will be described in more detail in the following referring to drawings which merely represent embodiment examples. Like reference numerals designate like, similar or functionally like component parts or elements. The drawings show.

DETAILED DESCRIPTION OF THE PRESENTLY PREFERRED EMBODIMENTS

Figure 1:
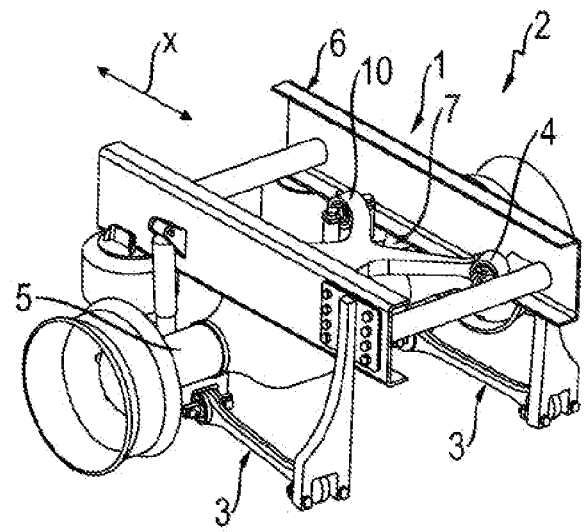
FIG. 1 is a perspective view of a chassis arrangement according to the prior art.

FIG. 1 shows a portion of a chassis 1, which is a component part of a motor vehicle, in the present case of a utility vehicle 2. The chassis 1 has two axle struts 3 arranged in a lower link plane. The two axle struts 3 are connected by one end, respectively, to a vehicle axle formed as a rigid axle 5 by a molecular joint. The axle struts 3 are connected by the other end indirectly to a vehicle frame 6 likewise by a molecular joint. Aside from the two axle struts 3, the rigid axle 5 is guided through a one-piece four-point link 7 arranged in an upper link plane and is substantially X-shaped. The four-point link 7 combines the functions of a three-point link and a separate roll stabilizer in one component part. The four-point link 7 is connected to the vehicle frame 6 in a frame-side bearing area 4 through two molecular joints and to the rigid axle 5 in an axle-side bearing area 10 through two molecular joints. Two of the total of four molecular joints are covered by a side member of the vehicle frame 6. As has already been indicated, a three-point link could be substituted for the four-point link 7 if the chassis 1 were to have a roll stabilizer in addition.

Figure 2:
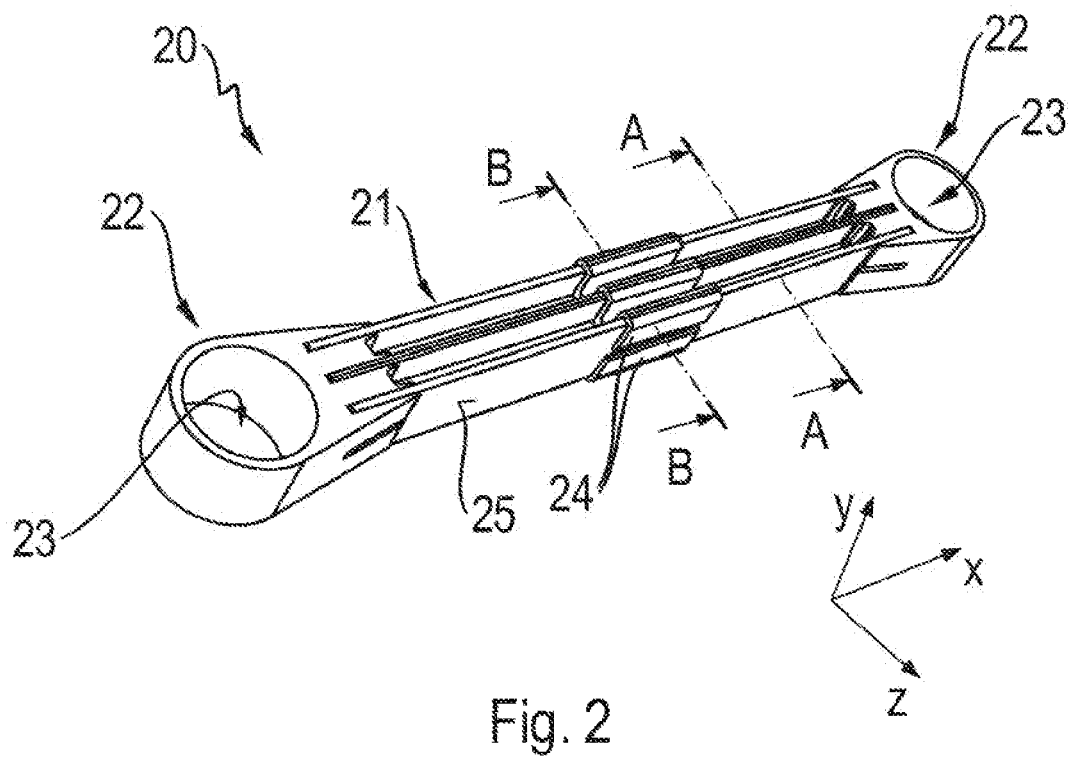
FIG. 2 is a multi-point link in a perspective view.

FIG. 2 shows a multi-point link 20 for a chassis of a motor vehicle, which multi-point link 20 is formed as a straight two-point link. The two-point link 20 is a built axle strut. The two-point link 20 has a straight and simultaneously open profile portion 21 that has two bearing areas 22 arranged at opposite ends of the profile portion 21. Each of the two bearing areas 22 has an opening 23 for receiving a molecular joint, not shown. Further, the two bearing areas 22 are formed as separate load introduction elements, each of which is glued to the profile portion 21. The two bearing areas 22 are connected to one another by the straight and simultaneously open profile portion 21 which extends in a longitudinal direction x. To increase the stiffness of the two-point link 22, two stiffening elements 24 are glued to an outer circumferential surface 25 of the profile portion 21.

Figure 3:
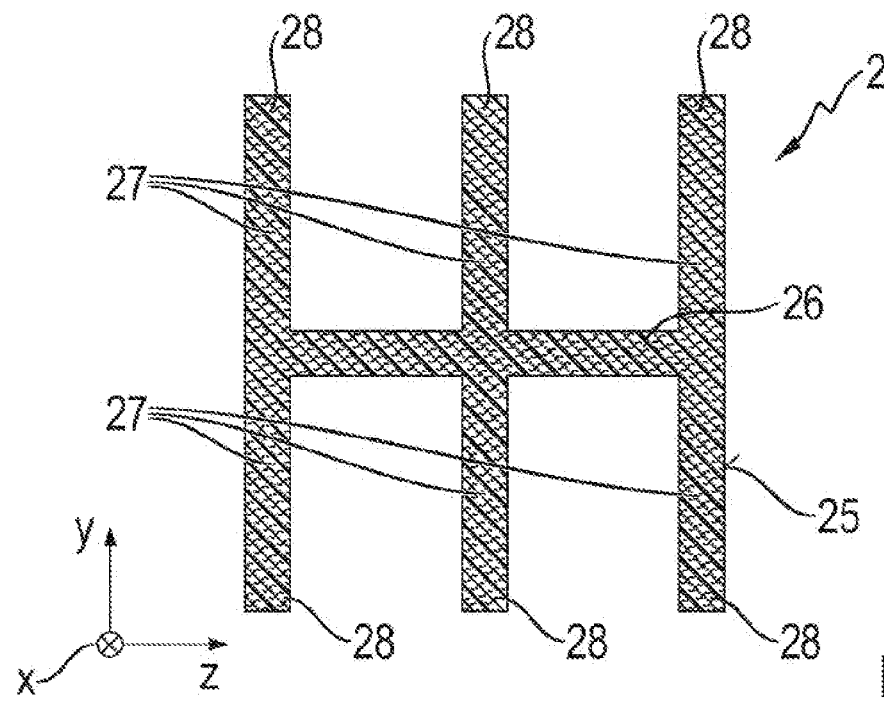
FIG. 3 is a sectional view of the multi-point link according to FIG. 2 along the section line A-A indicated therein.

It will be appreciated from FIG. 3 that the profile portion 21, considered in cross section, has a crosspiece 26 extending in a vertical direction z and a plurality of flanges 27 which are spaced apart parallel to one another and connected by the crosspiece 26. The flanges 27 extend in a transverse direction y oriented orthogonal to the vertical direction z and have, in each instance, a free end 28 extending away from the crosspiece 26. Specifically, the cross section of the profile portion 21 is formed to be double E-shaped with a total of six flanges 27, three of which flanges 27 extend in a rib-like manner away from the crosspiece 26 in directions which are offset by 180 degrees. The straight and simultaneously open profile portion 21 is formed as a pultruded profile portion 21 from a continuous fiber reinforced plastic and extends continuously in longitudinal direction x along its full longitudinal extension with constant cross section.

Figure 4:
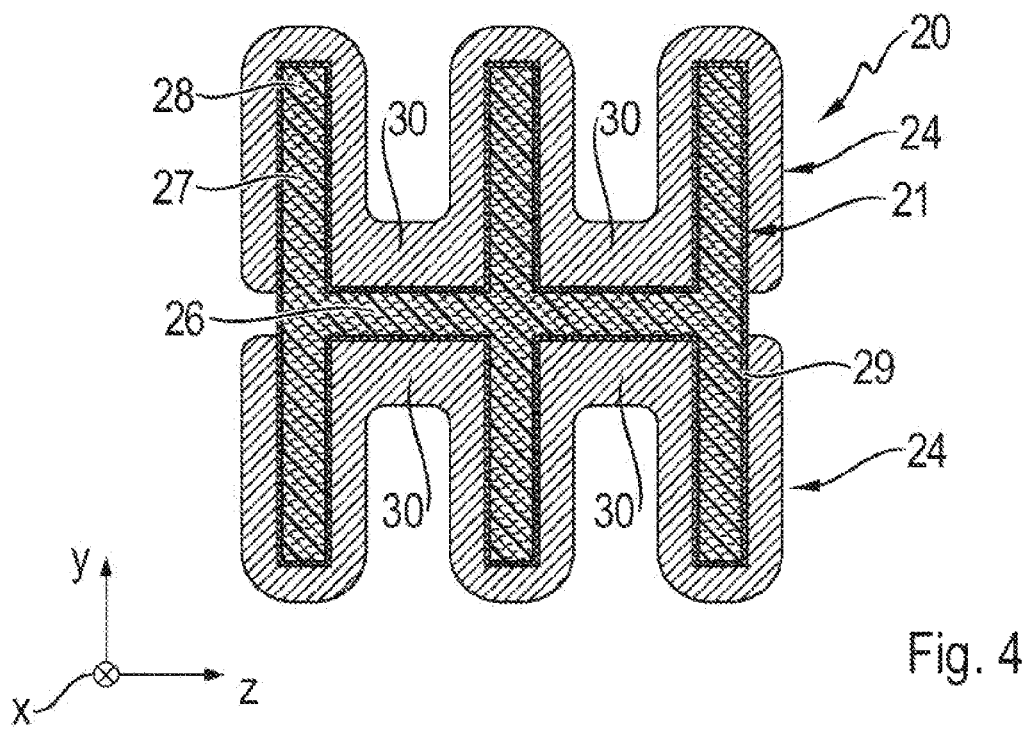
FIG. 4 is a sectional view of the chassis link according to FIG. 2 along the section line B-B indicated therein.

FIG. 4 shows that an adhesive layer 29 applied over the entire surface is located between the profile portion 21 and the two stiffening elements 24 and connects the profile portion 21 and the two stiffening elements 24 by material bonding. Further, it will be appreciated that not only the free ends 28 of the flanges 27 but rather the flanges 27 in their entirety are surroundingly enclosed by the two stiffening elements 24. Accordingly, a plurality of contour areas of the profile portion 21, namely, the free ends 28 of the flanges 27 as well as the flanges 27 themselves, are surroundingly enclosed by the stiffening element 24 such that the profile portion 21 in these contour areas is connected to the stiffening element 24 by material bonding and, at the same time, by positive engagement. In this regard, three flanges 27, which are arranged parallel to one another and extend in the same direction away from the crosspiece 26, are surroundingly enclosed by the same stiffening element 24. To this end, the two stiffening elements 24, which are carryover parts, have two coupling portions 30 in each instance. Two adjacent areas of the stiffening element 24 that enclose two adjacent flanges 27 arranged parallel to one another are rigidly connected to one another by each of the two coupling portions 30.

Figure 5:
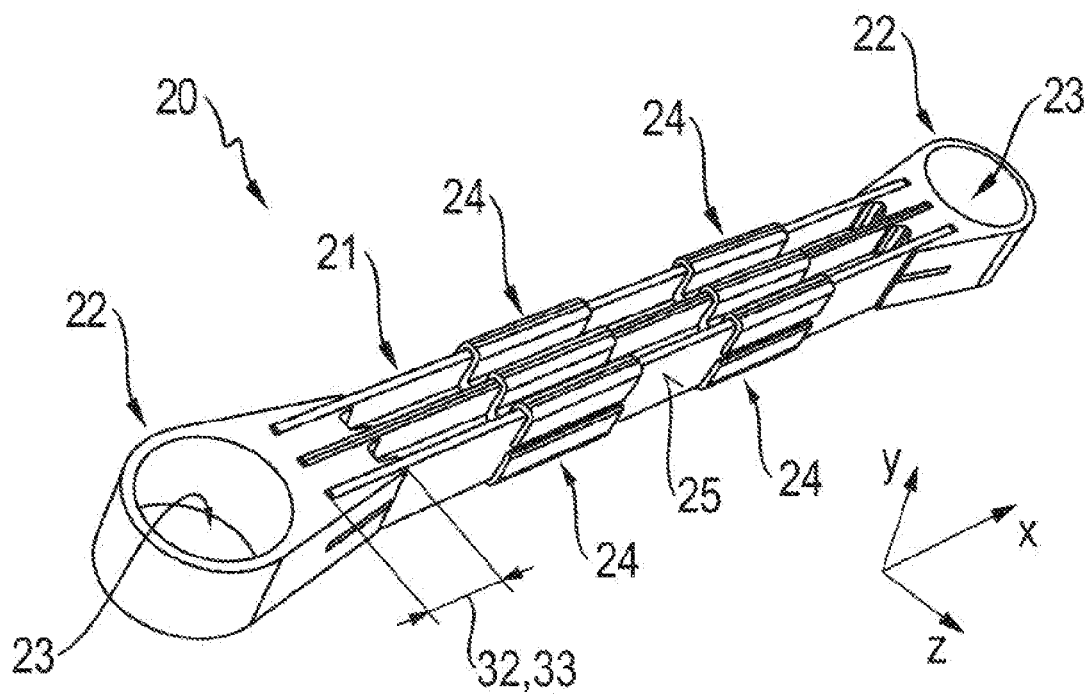
FIG. 5 is a perspective view of a multi-point link.

A two-point link 20, shown in FIG. 5, having a straight and simultaneously open profile portion 21 has a total of four stiffening elements 24 that are glued in each instance over the entire surface to an outer circumferential surface 25 of the profile portion 21. The profile portion 21 is virtually completely surrounded by two of the four stiffening elements 24, respectively, at two locations which are spaced apart from one another in longitudinal direction x of the profile portion 21. The two-point link 20, which is an axle strut, has two bearing areas 22 arranged at opposite ends of the profile portion 21 and are provided as separate load introduction elements rather than being formed in one piece with the profile portion 21. The two load introduction elements 22 have a spline 31 in each instance. The two splines 31 mutually engage in one another by an associated end portion 32 of the profile portion 21 in a common connection portion 33. The two splines 31 are respectively glued to one of the two end portions 32 of the profile portion 21.

Figure 6:
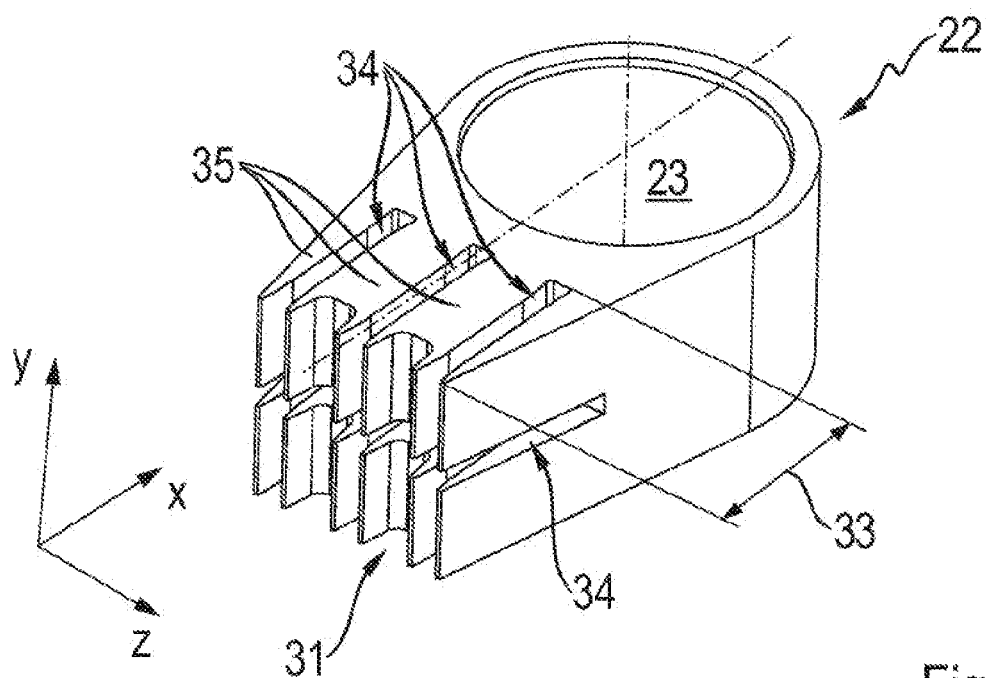
FIG. 6 is a perspective view of a load introduction element of the multi-point link according to FIG. 5.

It will be appreciated from FIG. 6 that the spline 31 of the load introduction element 22 has through-slots 34 extending therethrough in a grid-like manner, which through-slots 34 run perpendicular to the longitudinal direction x of the profile portion 21 and partially intersect at the same time. Accordingly, the load introduction element 22 is not formed solid in the area of the spline 31 but rather has a volume which is reduced by the volume of the through-slots 34. Because of the grid-like arrangement of the through-slots 34, the spline 31 has teeth 35 with rectangular cross section which extend in longitudinal direction x of the profile portion 21. The load introduction element 21 comprises an aluminum alloy and is formed as a portion of an extruded profile. The through-slots 34 which extend in an extrusion direction running in transverse direction y are a component part of the extruded profile and are installed without further finishing work. The teeth 35 of the spline 31 are formed to narrow at tooth bases at which the teeth 35 transition into solid material of the load introduction element 22 in order to reduce the longitudinal stiffness of the spline 31. Likewise for reducing the longitudinal stiffness, i.e., the stiffness in longitudinal direction x of the profile portion 21, the free ends of the teeth 35 facing the profile portion 21 have a minimum cross-sectional area perpendicular to the longitudinal direction x of the profile portion 21.

Figure 7:
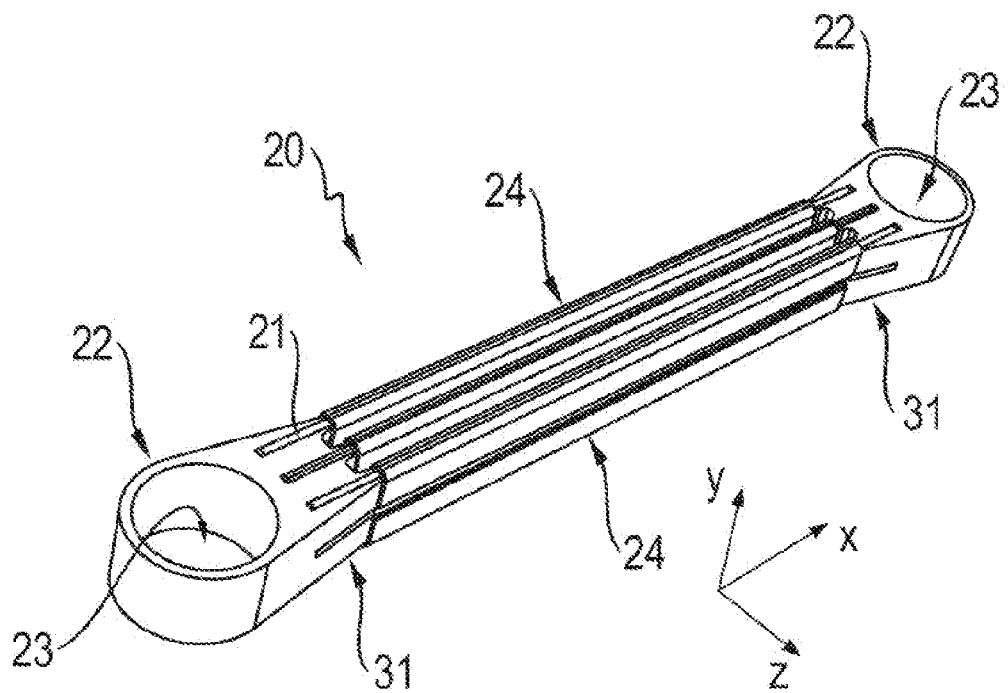
FIG. 7 is a perspective view of a multi-point link.

FIG. 7 shows a two-point link 20 in which two bearing areas 22, which are formed as separate load introduction elements, have a spline 31 in each instance. An outer circumferential surface 25 of a profile portion 21 which connects the two load introduction elements 22 to one another is completely covered between the two splines 31 by two stiffening elements 24.

Figure 8:
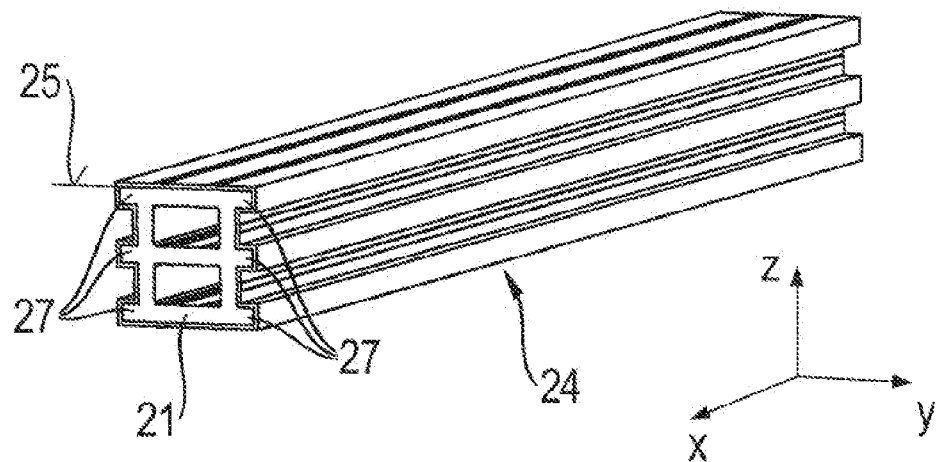
FIG. 8 is a perspective view of a profile portion of a multi-point link.

FIG. 8 shows a profile portion 21 for a multi-point link 20 in which an outer circumferential surface 25 of the straight and simultaneously open profile portion 21 is completely covered by an individual stiffening element 24. The stiffening element 24 surrounds the profile portion 21 in the manner of a fully circumferentially adjoining sheet metal collar. Viewed in cross section, the open profile portion 21 has, within the meaning of the present invention, six flanges 27 facing outward from the profile in a rib-like manner and two inner hollow chambers.

Figure 9:
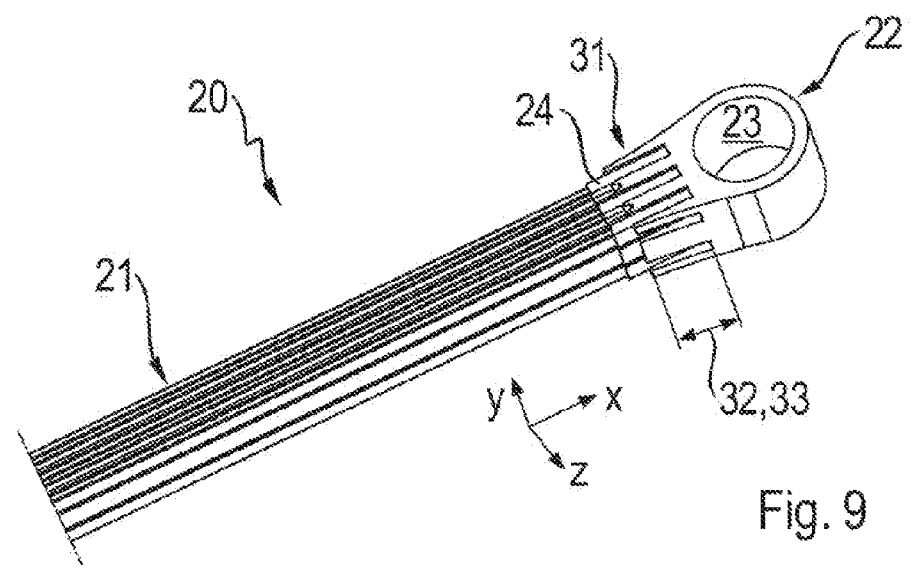
FIG. 9 is a perspective view of a part of a multi-point link.

FIG. 9 shows one half of a two-point link 20 in which, in addition to an end portion 32 of a profile portion 21, a stiffening element 24 inside of a connection portion 33 also engages in a spline 31 of a bearing area 22 which is formed as a load introduction element. A portion of the stiffening element 24 located inside the spline 31 is glued to the load introduction element 22 in the area of a connection portion 33. The stiffening element 24 engages in the spline 31 substantially up to the stop and at the same time extends out of the latter by 20 millimeters in direction of a second load introduction element 22, not shown.

Figure 10:
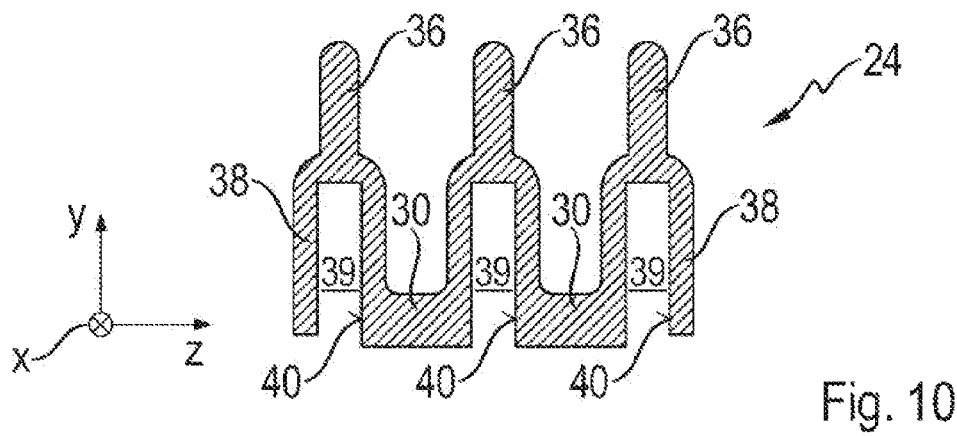
FIG. 10 is a sectional view of a stiffening element.
Figure 11:
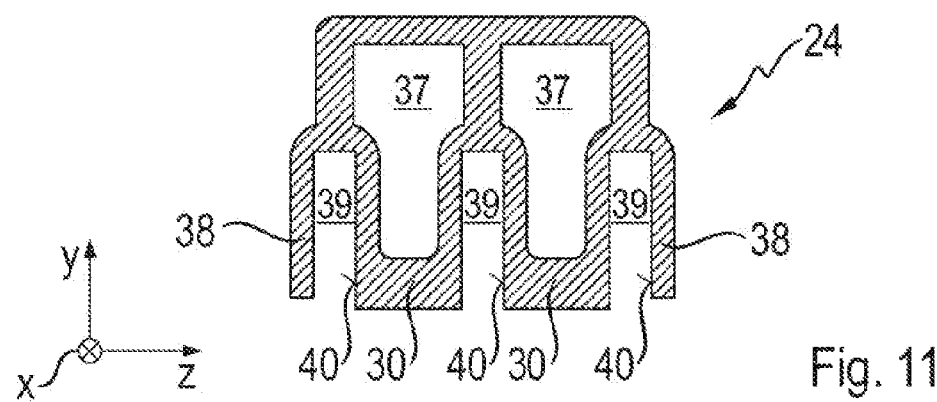
FIG. 11 is a sectional view of a stiffening element.

A stiffening element 24 shown in FIG. 10 has three solid ribs 36 with free ends facing outward from the profile to increase an area moment of inertia and a section modulus of a profile portion 21, which is not shown. Three recesses 39 extending in transverse direction y serve for the surrounding enclosure of flanges 27. Inner circumferential surfaces of the recesses 39 form contact surfaces 40 which face an outer circumferential surface 25 of a profile portion 21 in the assembled state of the multi-point link 20 and are spaced apart therefrom only by an adhesive layer 29. The recesses 39 have wall portions 38 which extend in transverse direction y and which are formed thinner than two coupling portions 30 which extend in vertical direction z. FIG. 11 shows a stiffening element 24 which differs from the stiffening element 24 shown in FIG. 10 in that it is formed as a hollow profile with two hollow chambers 37.

Figure 12:
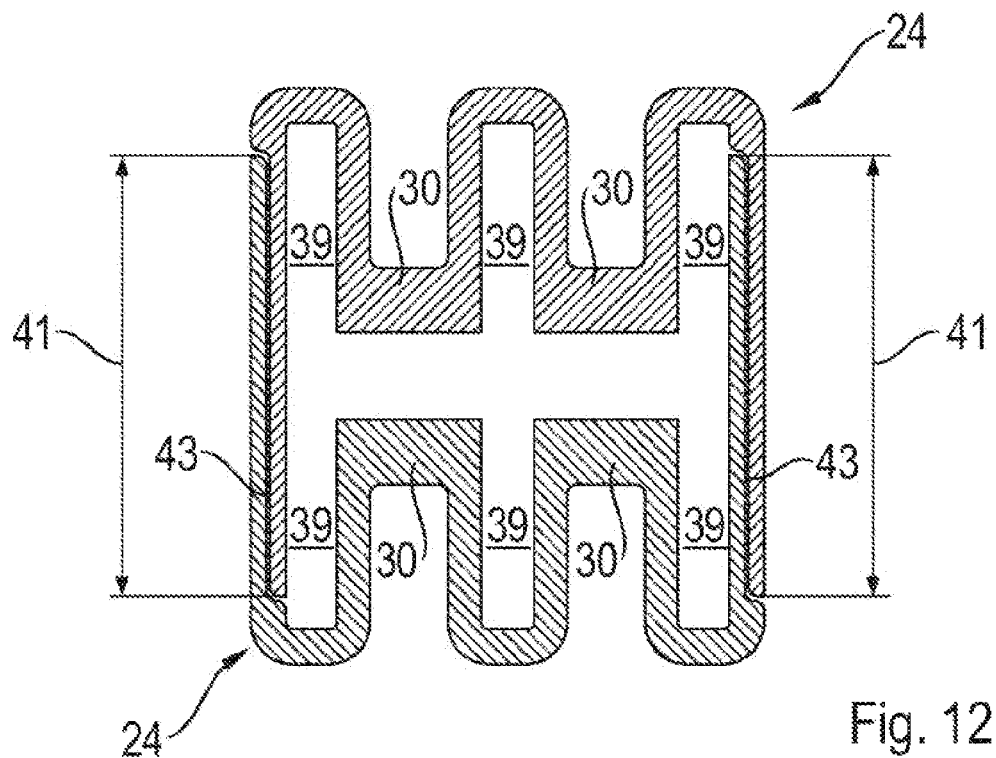
FIG. 12 is a sectional view of stiffening elements.
Figure 13:
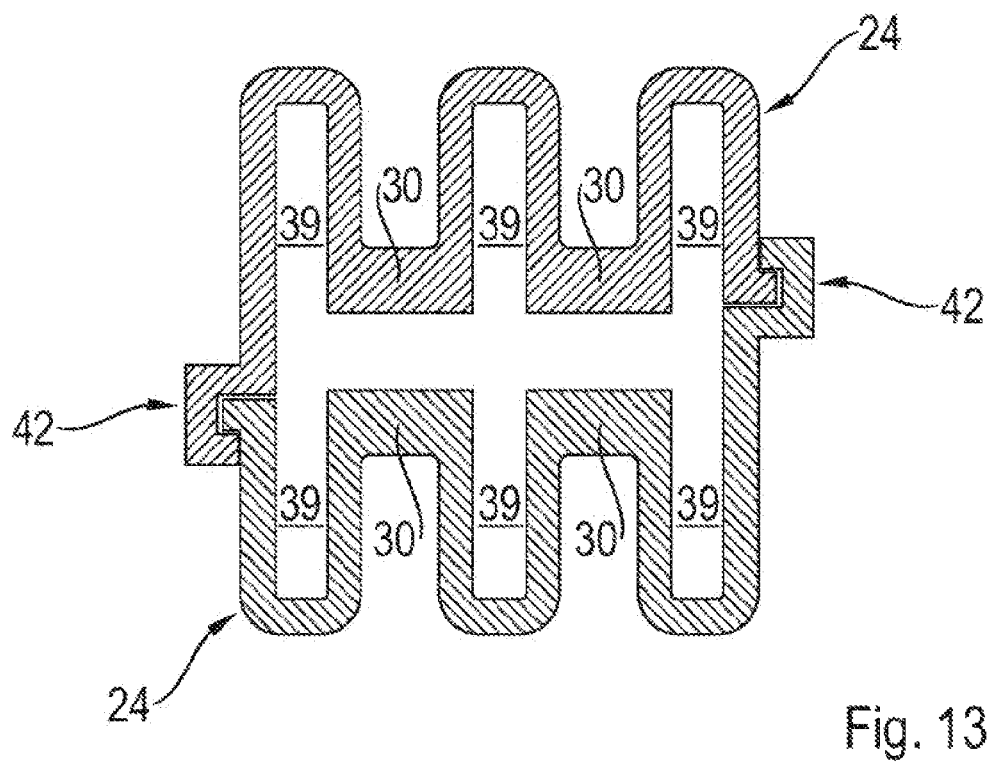
FIG. 13 is a sectional view of stiffening elements.

FIG. 12 shows an arrangement of two stiffening elements 24 which are formed as identical carryover parts and surround a profile portion 21, not shown. The two stiffening elements 24 are connected to one another by a gluing 43 in two common overlapping areas 41 in which the two stiffening element 24 overlap. In this way, the two stiffening elements 24 act as a hollow profile. FIG. 13 shows two stiffening elements 24 which are likewise formed as identical carryover parts and surround a profile portion 21, not shown. The two stiffening elements 24 communicate with one another circumferentially through two catch connections 42.

Figure 14:
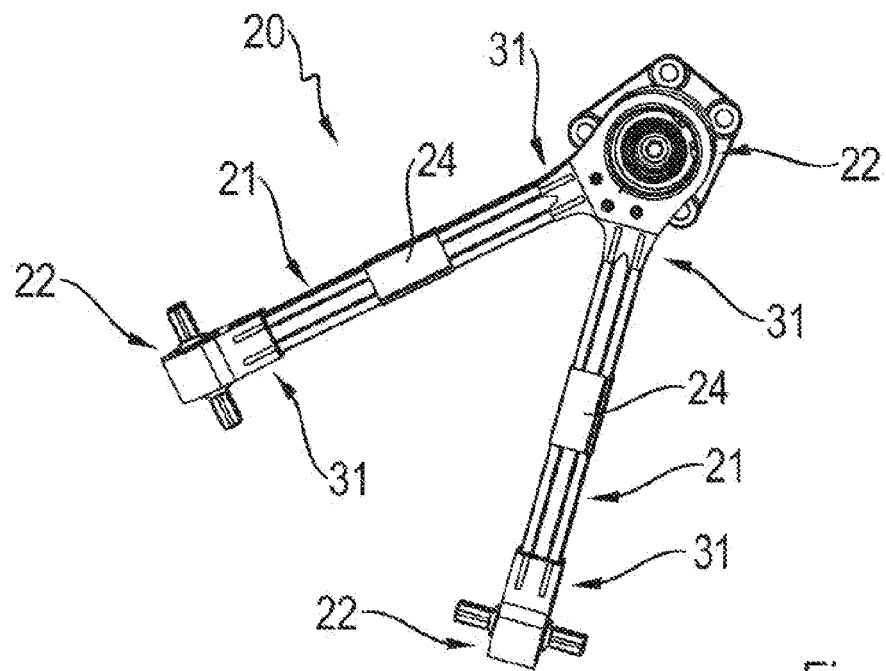
FIG. 14 is a perspective view of a multi-point link.

FIG. 14 shows a multi-point link 20 which is formed as a built three-point link. The three-point link 20 has two identical profile portions 21 which are straight and open at the same time and which are formed as pultruded profile portions 21 from a continuous fiber reinforced plastic. The profile portions 21 converge in a common bearing area 22 formed as a separate load introduction element and, at the same time, is part of a central joint of a rigid axle. This means within the meaning of the present invention that each of the two profile portions 21 has a bearing area 22 at this location, which bearing area 22 coincides with the other respective bearing area 22. At free ends remote of the common bearing area 22, the profile portions 21, respectively, have a bearing area 22 formed as a separate load introduction element and which has a molecular joint. All of the load introduction elements 22 have splines 31 which are oriented toward the associated ends of the profile portions 21. Since the profile portions 21 of the three-point link 20 are acted upon, inter alia, by bending during driving operation, the two profile portions 21 each have a stiffening element 24 approximately in the center.

Figure 15:
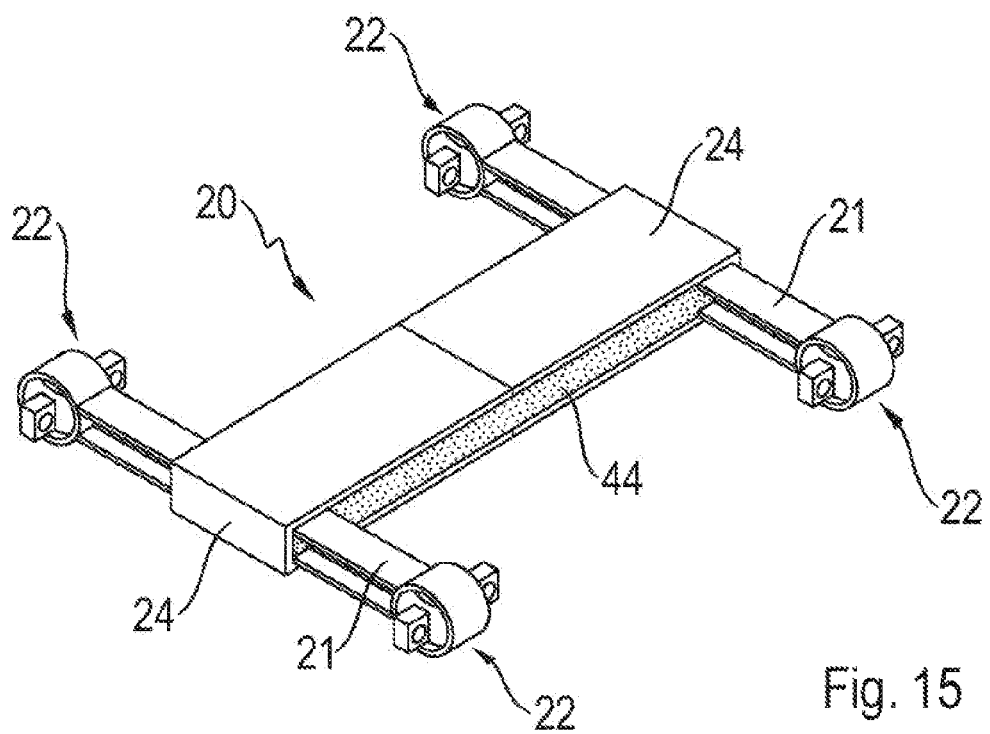
FIG. 15 is a perspective view of a multi-point link.

A multi-point link 20 shown in FIG. 15 is formed as a four-point link that has two profile portions 21 parallelly spaced apart from one another and which are fixedly connected to one another by a coupling element 44. Each profile portion 21 is surroundingly enclosed on three sides by a stiffening element 24 in a central area of its longitudinal extension and is glued to this stiffening element 24. The profile portions 21 are connected, respectively, on the respective fourth circumferential side to the coupling element 44. Each stiffening element 24 has two brackets which are spaced apart parallel to one another, the total of four brackets meeting in pairs in the middle between the two profile portions 21. Accordingly, the brackets are U-shaped viewed in cross section. The brackets which are glued over the entire surface to the coupling element 44 on oppositely directed sides thereof are function-integrating elements of the stiffening elements 24. The brackets serve to reinforce the fixed connection between the profile portions 21 and the coupling element 44. A bearing area 22 with a molecular joint is arranged, respectively, at each end of the two profile portions 21 of the four-point link 20.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A multi-point link for a chassis of a motor vehicle, comprising:
   at least one stiffening element;
   at least one profile portion;
   two bearing areas arranged at opposite ends of the at least one profile portion and the two bearing areas are connected to one another by the at least one profile portion; and
   an entire outer circumferential surface of the at least one profile portion is provided with the at least one stiffening element to increase a stiffness of the multi-point link,
   wherein an entire radially inner surface of the at least one stiffening element is in contact with and connected to the outer circumferential surface of the at least one profile portion by material bonding.

2. The multi-point link according to claim 1,
   wherein an adhesive layer is arranged between the at least one profile portion and the at least one stiffening element,
   wherein the adhesive layer connects the at least one profile portion and the at least one stiffening element to one another by material bonding.

3. The multi-point link according to claim 1, wherein at least one contour area of the at least one profile portion is surroundingly enclosed by the at least one stiffening element such that the at least one profile portion is simultaneously connected to the at least one stiffening element in the at least one contour area via material bonding and positive engagement.

4. The multi-point link according to claim 1, wherein the at least one profile portion has a cross section with a crosspiece extending in a vertical direction (z) and a plurality of flanges that are spaced apart parallel to one another and connected to one another by the crosspiece, wherein the plurality of flanges extend in a transverse direction (y) oriented orthogonal to the vertical direction (z).

5. The multi-point link according to claim 4, wherein at least one free end of a respective flange is surroundingly enclosed by the at least one stiffening element.

6. The multi-point link according to claim 4, wherein a plurality of flanges are arranged parallel to one another and are surroundingly enclosed by a same stiffening element.

7. The multi-point link according to claim 1, wherein the at least one stiffening element has wall portions of different thickness.

8. The multi-point link according to claim 1, wherein the at least one stiffening element is formed as a hollow profile with at least one hollow chamber.

9. The multi-point link according to claim 1, wherein the outer circumferential surface of the at least one profile portion is provided with a plurality of stiffening elements.

10. The multi-point link according to claim 9, wherein the plurality of stiffening elements are identically formed at least in cross section.

11. The multi-point link according to claim 9, wherein the plurality of stiffening elements partially overlap.

12. The multi-point link according to claim 9, wherein the plurality of stiffening elements communicate with one another circumferentially through one of catch connections, snap connections, and clip connections.

13. The multi-point link according to claim 1, wherein the at least one profile portion is formed as a pultruded profile portion from a continuous fiber reinforced plastic.

14. The multi-point link according to claim 1, wherein at least one bearing area of the two bearing areas has a spline, and the spline and an end portion of the at least one profile portion mutually engage in one another in a common connection portion and are glued to one another.

15. The multi-point link according to claim 14, wherein the two bearing areas have a spline in each instance, and in that the outer circumferential surface of the at least one profile portion is completely covered by the at least one stiffening element between the respective splines.

16. A multi-point link for a chassis of a motor vehicle, comprising:
- at least one stiffening element;
- at least one profile portion;
- two bearing areas arranged at opposite ends of the at least one profile portion and the two bearing areas are connected to one another by the at least one profile portion; and
- an outer circumferential surface of the at least one profile portion is provided with the at least one stiffening element to increase a stiffness of the multi-point link,
- wherein the at least one stiffening element is connected to the outer circumferential surface of the at least one profile portion by material bonding,
- wherein the outer circumferential surface of the at least one profile portion is provided with a plurality of stiffening elements, and
- wherein the plurality of stiffening elements surround the at least one profile portion completely, at least at one location.

17. A multi-point link for a chassis of a motor vehicle, comprising:
- at least one stiffening element;
- at least one profile portion;
- two bearing areas arranged at opposite ends of the at least one profile portion and the two bearing areas are connected to one another by the at least one profile portion; and
- an outer circumferential surface of the at least one profile portion is provided with the at least one stiffening element to increase a stiffness of the multi-point link,
- wherein the at least one stiffening element is connected to the outer circumferential surface of the at least one profile portion by material bonding,
- wherein at least one bearing area of the two bearing areas has a spline, and the spline and an end portion of the at least one profile portion mutually engage in one another in a common connection portion and are glued to one another,
- wherein, in addition to the end portion of the at least one profile portion, at least one stiffening element inside of the common connection portion also engages in the spline.

* * * * *